Patented Nov. 4, 1947

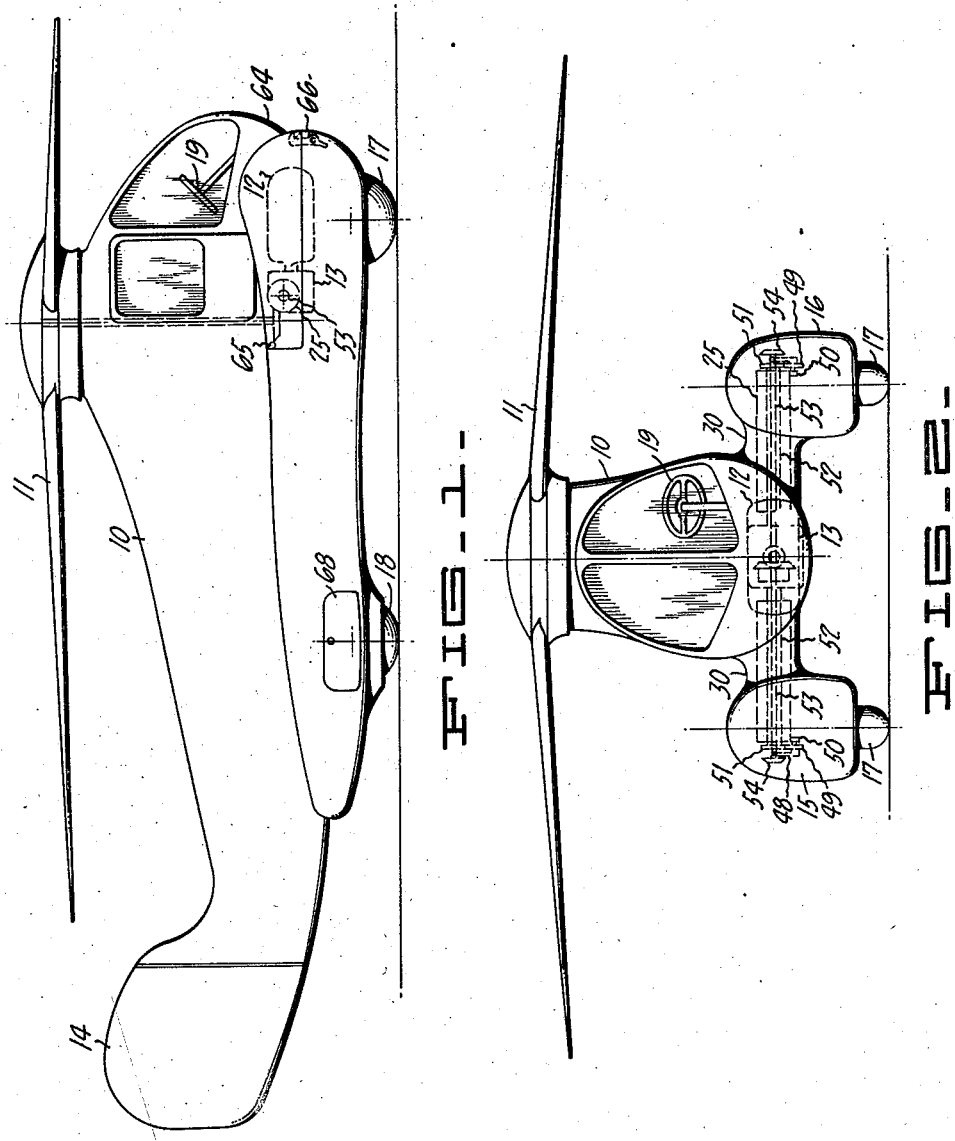

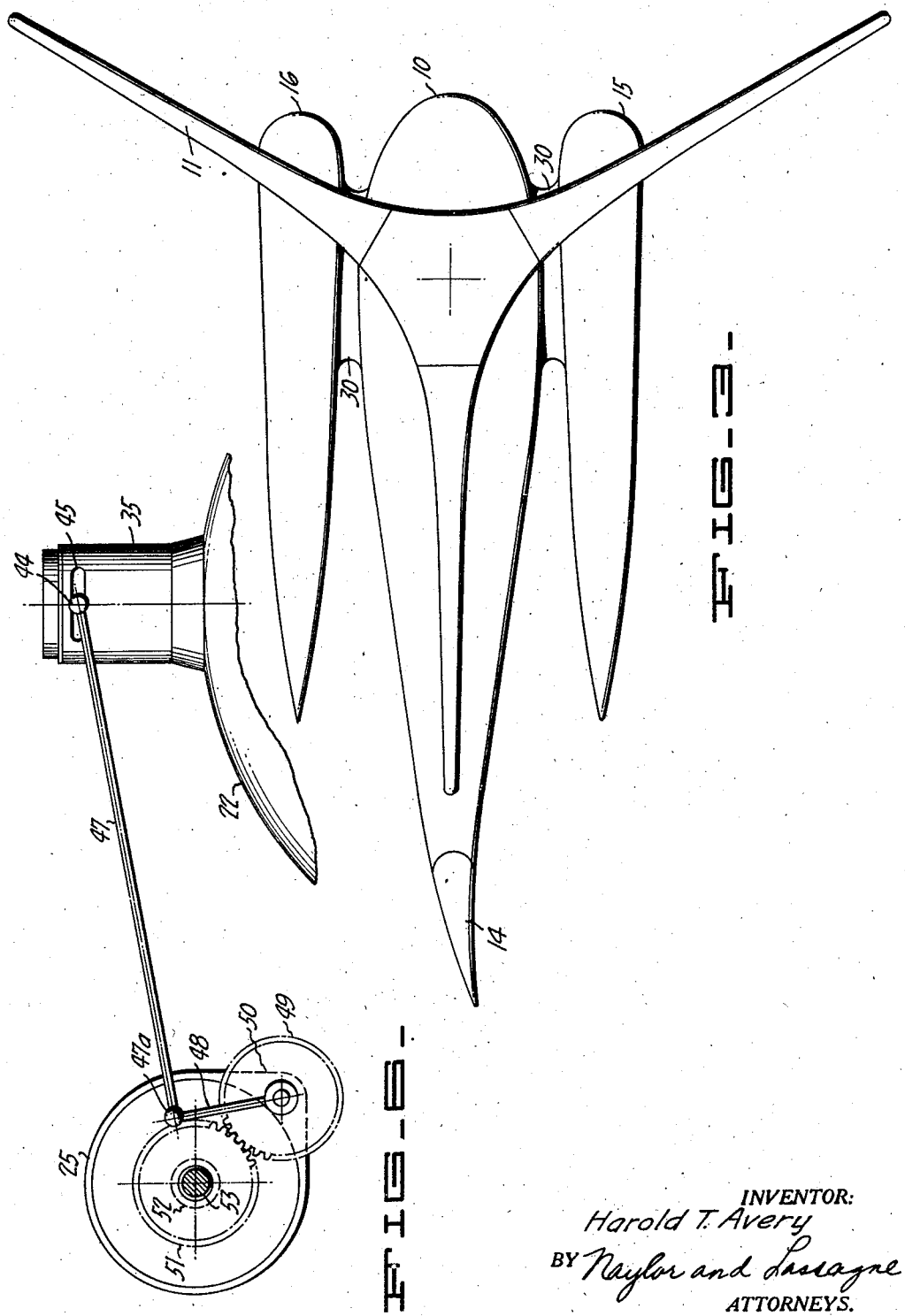

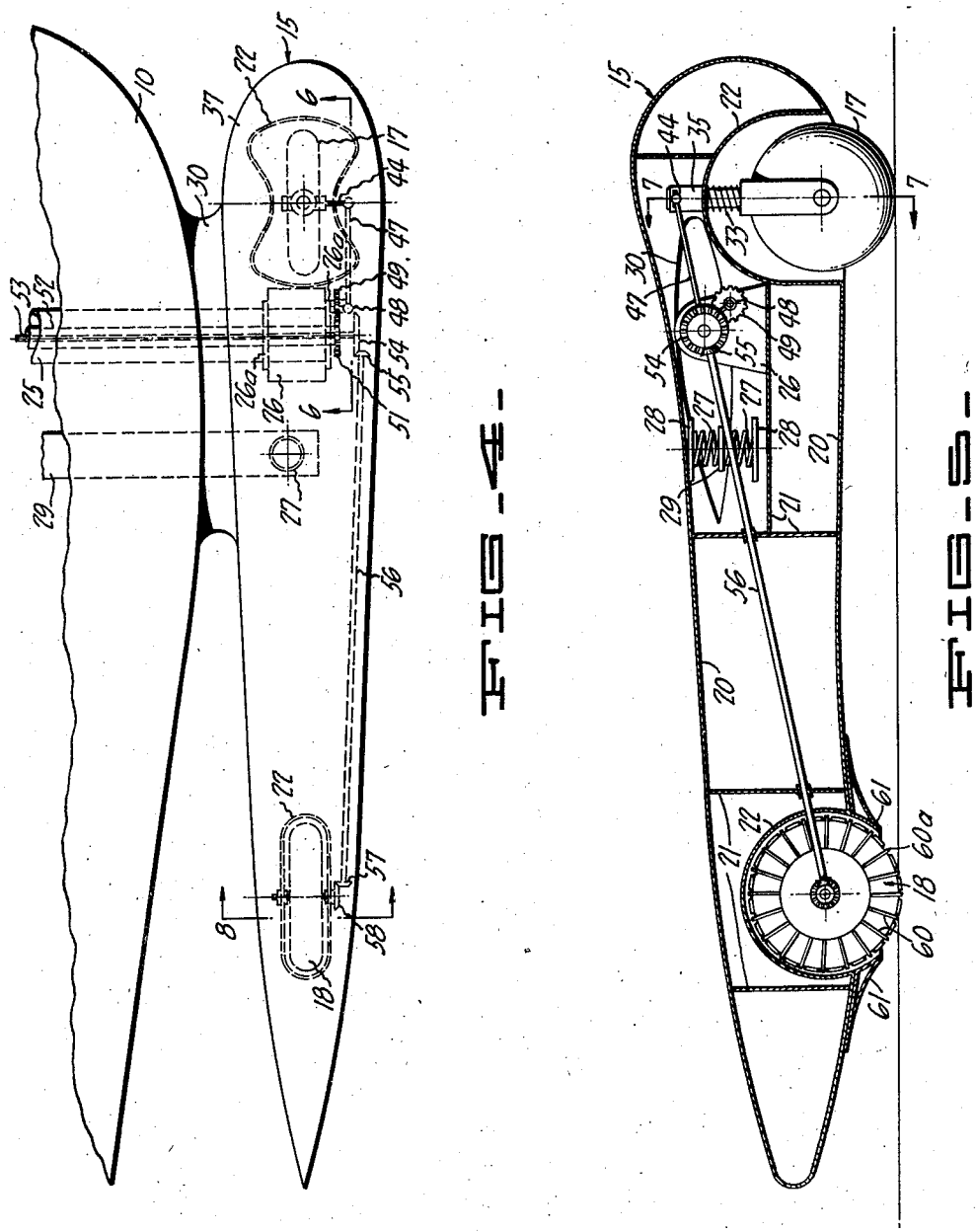

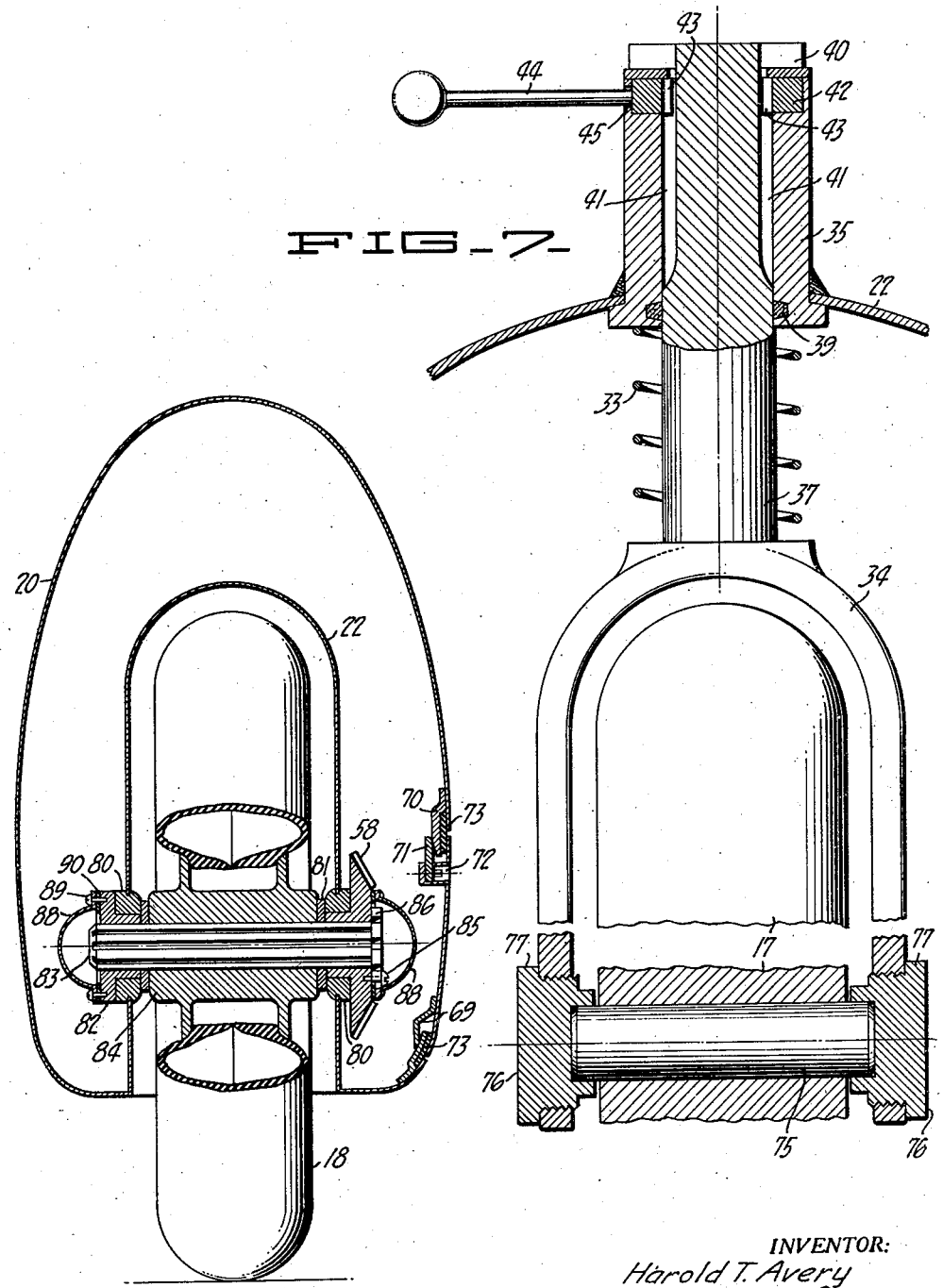

2,429,975

UNITED STATES PATENT OFFICE 2,429,975

AMPHIBIAN SUPPORTING AND PROPELLING STRUCTURE FOR AIRCRAFT AND THE LIKE

Harold T. Avery, Oakland, Calif.

Application July 27, 1943, Serial No. 496,274

14 Claims. (Cl. 244—50)

The present invention relates to aircraft and particularly to improved landing and propulsion gear therefor, including means for cushioning the landing, sustaining the craft and propelling the same on the surface of the water as well as on many different kinds of solid and semi-solid surfaces. The invention is particularly adapted for use in helicopters and other rotating wing aircraft.

Aircraft of the rotating wing species have been constructed with wheels adapting the craft to take off from and land on ground surfaces, particularly if the surfaces be relatively smooth and hard. Some such craft have been provided with what is known as "roadable" performance, whereby the craft becomes capable of controlled self-propulsion along the earth's surface.

Other craft of the rotating wing species have been constructed with large rubberized pontoons, permitting the craft to land on and take off from the surface of water, hard ground, sand, mud, snow or ice, but such craft have entirely lacked the roadable feature, thus leaving such a craft, in general, immovable so long as it rests upon a solid or semi-solid surface. These pontoons have not been of good aerodynamic shape because the materials of which they were constructed and the requirements for supplying spring action in landing by deformation of the pontoons themselves seemed to require the use of pontoons generally cylindrical in shape.

My invention is illustrated as applied to a helicopter, in a form which provides a craft with all the advantages of both of the above described arrangements and additional advantages not found in any such previous craft. With my craft for instance, it is possible to drive the craft under its own power from its place of storage to a nearby take-off lot, fly to a desired destination and without any readjustment of landing gear land safely on water, solid ground, sand, mud, ice (even of uncertain strength), snow or almost any other kind of surface. On suitable ground or ice the "roadable" feature mentioned in connection with take-off may again be employed, while on water the lifting rotor and steering controls may be utilized to maneuver the craft. When it is desired to run up to piers or floats, or onto beaches where the presence of persons, or of trees or other obstacles might render it undesirable to approach with a whirling rotor the same mechanisms which operate the "roadable" feature employed on the ground may be utilized to propel and steer the craft. Furthermore, this very versatile performance is provided by mechanism so constructed that it is adapted for flight and for landing on either land or water without any readjustment, a consideration of particular importance in an aircraft adapted for operation by the general public.

The adaptability of the novel structure to this extremely varied performance is further enhanced by mounting the landing wheels largely within enclosures which at all times provide substantially minimum aerodynamic resistance to forward flight and are capable of providing flotation on water with the flotation volume so distributed as to give a center of buoyancy properly related to the center of gravity of the craft.

The objects of the invention therefore include:

To provide an improved landing gear for aircraft.

To provide landing gear which, without readjustment will permanently possess improved amphibian characteristics.

To provide improved means for maneuvering an aircraft on the ground surface and alternatively on the surface of water.

To provide improved spring means constituting both a cushioning device for the landing of aircraft and also a spring suspension for the craft in moving over ground surface.

To provide such spring means in a form particularly adapted for use in amphibian landing gear.

To provide complete amphibian landing gear for aircraft in a form which without readjustment will offer substantially minimum aerodynamic resistance to forward flight of the craft.

To provide convenient arrangements for the servicing of the novel landing gear mechanism.

Additional objects and advantages of the invention will be apparent in the course of the following description of a preferred embodiment thereof which is to be read with reference to the accompanying drawings, in which:

Figure 1 is a side view of a craft embodying my invention.

Figure 2 is a front view of the same craft.

Figure 3 is a plan view of the same craft.

Figure 4 is a plan view showing to a larger scale one of the two landing gear units with which the craft is equipped, and indicating some of the mechanism related to the unit.

Figure 5 is a right side view of the same unit, showing the walls of the unit cut in section along the longitudinal center line of the unit, but with the operating mechanisms of the unit left in place.

Figure 6 is an enlarged view taken substantially along line 6—6 of Figure 4.

Figure 7 is a section taken substantially on the line 7—7 of Figure 5.

Figure 8 is a section taken substantially on the line 8—8 of Figure 4.

As illustrated particularly in Figures 1, 2, and 3 the invention is shown as applied to a helicopter having a fuselage 10 arranged to be sustained and propelled in flight by lifting rotor 11. Power from engine 12 may be selectively applied to rotor 11 under the control of clutching and transmission unit 13. The rotor driving torque may be counterbalanced under normal cruising conditions by an adjustable rudder 14, while under low speed and hovering conditions auxiliary means (not shown) may be employed, which means may, for instance, correspond to the auxiliary airscrew disclosed in my copending application Serial Number 402,283 filed July 14, 1941 now matured into Patent 2,369,652, as being normally sealed within the fuselage and selectively brought into operation as required.

To sustain the craft when resting upon the surface of either ground or water two landing gear units 15 and 16 (Figures 1, 2 and 3) are provided on the right and left of the craft, respectively, these two units being symmetrically similar. Each of these units comprises two wheels 17 and 18 (Figures 1A and 5), preferably equipped with rubber tires. Each unit (Figures 4 and 5) consists essentially of a water-tight enclosure, preferably blunt-nosed and sharp-tailed, and adapted to act as a float when the craft is on water. Two downwardly opening wells defined by hermetically sealed partitions 22 are provided for receiving the two wheels, the entire unit thus providing a streamlined fairing for reducing the aerodynamic resistance of the wheels in flight.

As illustrated particularly in Figures 4 and 5 each unit includes an outer shell 20, preferably of metal or some other relatively rigid material, and may include an internal supporting framework or system of stiffening members (not shown). It also preferably includes a number of internal partitions 21, dividing the enclosed space into a plurality of separate water-tight compartments less than all of which will provide sufficient buoyance to prevent sinking of the craft, thus lessening the danger in case of leakage or damage to any portion of either unit.

Wheels 17 and 18 extend down through openings in the bottom part of the outer shell 20, but shells 22 in the shape of inverted cups are hermetically sealed to the shell 20 completely around the edges of each opening, thus forming "diving bells" extending upwardly into the units which "diving bells" are of proper size and shape to accommodate the wheels, but do not break the continuity of the water-tight exterior surface of the main portion of the unit. As will be apparent on reference to Figures 4, 5, and 8 the bell 22 surrounding the rear wheel 18 conforms rather closely to the shape of the wheel and fits the contour of the wheel with a relatively uniform clearance at all points, while the well 22 for the front wheel 17 is of sufficient extra depth to permit of vertical movement of the wheel relative to the enclosure for the purpose of the spring suspension hereinafter described; and is of such shape in plan as to permit of the wheel being turned through a sufficient angle in either direction from the normally aligned position in which it is shown in Figure 4 to permit steering operations. Preferably the "diving bells" are of sufficient volume so that the air trapped in them when the craft lands on water will of itself suffice to keep the craft from sinking. Then if the entire outer shells of the landing gear units were leaking but the walls of the inner walls were intact, the craft would still remain afloat. This provides an extra degree of safety in view of the fact that the outer walls tend to protect the walls of the inner wells from physical damage.

Each of the units described above is structurally connected to fuselage 10 (for support of the units by the fuselage in flight and support of the fuselage by the units at all other times) primarily by a tubular frame member 25 (Figures 1, 2, 4 and 5) which is integral with the framework of the fuselage 10 and extends outwardly therefrom. Pivotally mounted on tube 25 near its outer end, and restrained from moving longitudinally with respect to the tube by means such as collars 26a, is a bracket 26 (Figures 4 and 5) integral with the framework of the landing gear unit, so that each landing gear unit is, in effect pivotally mounted on tube 25. Rotational movement of each unit about the tube 25 is constrained by two springs 27 each of which is compressed between a frame member 28 of the landing gear unit and a beam 29 integral with the framework of fuselage 10. Optionally the elastic deflection of beam 29 may augment or take the place of the yielding of springs 27 in permitting rotational displacement between the landing gear unit and the fuslage. The portions of tube 25 and of beam 29 which lie in between the fuselage and the landing gear unit may be enclosed within a streamlined flexible covering 30 (Figures 2, 3 and 4) extending between the fuselage and the landing gear unit.

The front wheels 17 are equipped with spring mountings permitting of independent vertical movement and are adapted to be turned to steer the craft when it is driven along the ground, and upon similar turning to provide sufficient steering effect in connection with movement through the water to permit of emergency manipulation of the craft on water surfaces under conditions in which it would be undesirable to approach certain localities with the main lifting rotor 11 whirling.

Figures 4, 5, 6 and 7 illustrate the front wheel mounting which permits independent vertical movement of each wheel, and the transmission of steering movement to the wheels. Integrally mounted in the framework of each of the two units and sealed into a hole in the central topmost point of the covering 22 of the bell containing wheel 17 is a bushing 35 in which is journalled a vertical shaft 37 integral with a wheel fork 34. A seal 39 of cork or other suitable material preferably is inserted in bushing 35 near its lower end to prevent water and/or oil passing in either direction along shaft 37 past the seal. Integral with the upper end of shaft 37 is a flange 40 limiting downward movement of the shaft relative to the bushing, and a heavy spring 33 is compressed between the lower end of bushing 35 and an upper shoulder of fork 34, to independently spring each of the front wheels 17.

One or more keyways 41 are cut into the upper end of shaft 37 above the region of seal 39, and enclosed in a recess in the upper part of bushing 35 is a ring 42 having integral therewith one or more keys 43 extending into keyways 41. An arm 44 integral with ring 42 extends out through slot 45 in the outer wall of bushing 35. Hence each wheel 17 mounted in its fork 34 may move up or down relative to the landing gear unit in accordance with the amount of compression of its respective spring 33 under current loading forces, because shaft 37 is free to slide up and down within bushing 35 within a limited range of movement, while steering movement may be imparted to each wheel 17 by rotating shaft 37 in bushing 35.

The angular position of each ring 42, and hence of its associated wheel 17, is controlled by a linkage including arm 44, which is shown in Figures 4, 5 and 6 is pivotally connected by means of a link 47, through a ball and socket joint 47a, to an arm 48 integral with a gear 49 pivotally mounted on a flange 50 of the above described tube 25. Gear 49 meshes with a gear 51 integral with a sleeve 52, located centrally of the tube 25 and extending into the fuselage 10 where, through suitable connections not shown, it may be angularly positioned by any suitable means such as a steering wheel 19. Displacement of this linkage to effect steering will result in ball and socket joint 47a which connects link 47 to arm 48 moving through a limited arc and the arrangement is preferably such that this arc will on the average substantially coincide with a line joining arm 44 to the axis of tube 25; that is approximately as much of the arc will lie above as below such a line. This means that link 47 will at all times lie very nearly in a plane extending radially out from tube 25, and therefore angular displacement of the landing gear unit as a whole about tube 25 will not appreciably disturb the steering.

In order to propel the craft along the ground arrangements are provided for selectively transmitting power from the engine 12 to both of the rear wheels 18. The transmission and clutching unit 13 (Figures 1 and 2), in addition to comprising means for selectively clutching engine 12 to rotor 11 also comprises means for selectively clutching it to shafts 53 (see also Figures 4, 5 and 6) each of which shafts is in permanent driving relationship with a respective wheel 18. The transmission and clutching unit 13 may correspond, so far as its ability to connect engine 12 to shafts 53 is concerned, to well known automobile transmission and clutching means, at least to a degree sufficient to permit of selectively engaging the drive in either a forward or backward direction, and optionally for engaging it at more than one selective speed ratio in the forward direction.

Each shaft 53 extends out from the fuselage through the center of its respective tube 25, being rotatably supported within sleeve 52. Each shaft 53 has fixed thereto at its outer end a bevel gear 54 (Figures 2, 4 and 5) meshing with a bevel gear 55 integral with shaft 56 and bevel gear 58 which, as presently described, is operationally integral with wheel 18. Bushings equipped with water seals similar to the seal shown in bushing 35, may support the shaft in each of the internal partitions through which it passes.

Preferably the tires on wheels 18 are provided with especially heavy corrugations or side fins 60 (see Figure 5) to assist in exerting propulsion in the water, but on the outer surface of the tires the corrugations are blended into a tread design 60a, such that when the wheel is run upon a road or other solid ground no roughness of craft operation results. Wheels 18 will be more effective in water propulsion than a similarly shaped wheel would ordinarily be due to the fact that the well covering 22 confines the water picked up by the wheel, tending to cause it to be carried around with the wheel, with the result that a circulating vortex of water is freed only in a limited arc near the bottom of the wheel where its release gives a longitudinal reaction to the craft. The inefficient churning of water, which would otherwise occur, is largely eliminated, while the inward curves of the wall 22 below wheel center insure that the discharge will have a favorable thrust component. By the addition of guards 61 (preferably easily removable when inserting or removing wheel 18) this latter effect can be greatly augmented and the efficiency of wheel 18 as a water propeller increased.

A number of special provisions and details of construction are indicated in the drawings to facilitate servicing of the various mechanisms described. For instance, as indicated in Figure 1, the forward upper portion of each landing gear unit may include a displaceable section 64 pivotally mounted on hinge pin 65 and held down by latch 66 preferably releasable from within the fuselage. Also opposite wheel 18 may be a removable section 68 of the outer covering, which as particularly shown in Figure 8, may be held in place by brackets 69 integral with section 68 and resting against brackets 70 integral with covering 20, and by a latch 71, preferably rotatable from outside through a socket 72 and bearing against another bracket 70 integral with covering 20. The junctions in the covering are sealed by suitably shaped gaskets 73 of rubber or other suitable material, as are also the junctions around rockable section 64 above described.

To provide for convenient removal and replacement of front wheel 17, the wheel is preferably supported, as indicated in Figure 7, on a pin 75 slightly shorter than the space between the arms of fork 34. Pin 75 is supported by two screw members 76 adapted to be screwed into holes in the lower ends of the two arms of fork 34 and each having a socket for receiving and supporting one end of pin 75; screws 76 may have hexagonal heads 77 by means of which they may be easily screwed in or out while wheel 17 is in place in its well. By merely backing screws 76 out a sufficient distance wheel 17 may be directly removed or inserted with pin 75 in place within it.

An arrangement providing for convenient removal and replacement of rear wheels 18 is illustrated in Figure 8. Two bushings 80 are integrally attached to the framework of each landing gear unit and sealed into holes in the covering 22 of the well for wheel 18. The hub of the previously described bevel gear 58 bears in one of these and has a flange 81 integrally attached to it whereby gear 58 is retained relatively permanently in bushing 80. Hub member 82 is similarly assembled into the other bushing 80. A pin 83 with a plurality of spline grooves extends through the gear 58 and the hub member 82 and the inner surfaces of these two members are accordingly broached to correspond to the shape of the pin and to closely fit the various portions of the surface of the pin. The hub 84 of wheel 18 is broached to exactly the same shape so the pin serves to transmit the drive from gear 58 to wheel 18. One or more screws 85 may be employed to hold a flange 86 on one end of pin 83 against the face of gear 58. Bushings 80 may be provided with water seals (not shown). However, to prevent water from leaking along the surface of pin 83 and thus filling the float, waterproof caps 88 are attached to gear 58 and hub 82 respectively by means of screws 89 which clamp the caps against waterproof gaskets 90. By removing section 68, caps 88 and screw 85, pin 83 may be pulled and wheel 18 removed or inserted.

It will be observed that with the arrangements as above described, each rear wheel is capable of independent movement over a substantial range with respect to the fuselage within which the engine is mounted, and that this is accomplished without any variation of center distances of any gears or alteration of the alignment of any power transmitting shaft with respect to the framework of the unit within which it is mounted. In the craft herein disclosed this is of much greater importance than it would be in an automobile, for instance, for the power transmitting shafts pass through water seals at various points, which seals would be difficult to maintain if any displacement of the wheel or of the alignment of the drive shafts relative to their immediate surroundings was a necessary incident to independent displacement of the wheel relative to the fuselage. Furthermore, the arrangement is such that neither the rocking of the landing gear unit incidental to such displacement of the rear wheel 18, nor the independent displacement of front wheel 17 relative to the landing gear unit and to the fuselage will disturb the steering control of wheel 17.

Also it will be observed that the shape of the landing gear units is such as to not only give approximately minimum aerodynamic resistance to the flotation mechanism and aerodynamic shielding of the wheels so as to minimize drag in flight, but also is such as to ideally distribute the flotation volume relative to the distribution of craft weight. The craft weight is mostly located well forward, gradually decreasing toward the rear of the craft, and the same distribution is true of the flotation volume in the landing gear units, thus giving an ideal relationship between the center of flotation and the center of gravity.

I claim:

1. In an amphibious vehicle, a body portion, pontoon flotation means therefor, an unsprung pivotal connection between said pontoon flotation means and said body portion, drive wheel means carried by said pontoon flotation means, at a position radially remote from said unsprung pivotal connection, drive means extending from said body portion to said drive wheel means substantially in line with said unsprung pivotal connection, and other wheel means yieldably mounted on said pontoon flotation means at a position which is closer to said pivotal connection than is the position of said drive wheel means.

2. In an amphibious vehicle, a body portion, pontoon flotation means therefor, an unsprung pivotal connection between said pontoon flotation means and said body portion, spring means limiting pivotal movement of said pontoon flotation means with respect to said body portion, drive wheel means carried by said pontoon flotation means at a position radially remote from said unsprung pivotal connection, drive means extending from said body portion to said drive wheel means coaxially with said unsprung pivotal connection, and other wheel means yieldably mounted on said pontoon flotation means at a position displaced longitudinally of the vehicle from said pivotal connection in a direction opposite to the displacement of the drive wheel means therefrom.

3. In an amphibious vehicle, a body portion, pontoon flotation means therefor, an unsprung pivotal connection between said pontoon flotation means and said body portion, spring means limiting pivotal movement of said pontoon flotation means with respect to said body portion, a first wheel rotatable on an axis fixed relative to said pontoon flotation means at a position displaced longitudinally of the vehicle from said unsprung pivotal connection, and a second wheel rotatable on an axis vertically sprung relative to said pontoon flotation means at a position displaced longitudinally of the vehicle from said unsprung pivotal connection in a direction opposite to the direction of the displacement of the axis of said first wheel.

4. In an amphibious vehicle, a body portion, an engine in said body portion, flotation means comprising a float having enclosing walls, an unsprung pivotal connection between said float and said body portion a first wheel, an inverted well, open at its base, and having walls extending upwardly into said float and partially surrounding said wheel, means for transmitting power from the engine to said wheel including a power driven member extending from the body portion into the float along a line substantially coinciding with the axis of said pivotal connection and a power driven member extending through a wall of said inverted well, and a second wheel yieldably mounted on said float at a position which is closer than the position of said first wheel to said pivotal connection.

5. In an amphibious aircraft, a fuselage, landing gear comprising a wheel supporting structure, an unsprung pivotal connection between said structure and the fuselage, a first wheel rotatable on an axis fixed in said structure, and a second wheel rotatable on an axis vertically displaceable with respect to said structure; the axis of said first wheel being located further from said pivotal connection than the axis of said second wheel, and one of said axes being located to the rear of and the other of said axes in front of said pivotal connection.

6. The invention set forth in claim 5 in combination with means for yieldably resisting the displacement of said last named axis relative to said structure.

7. In an amphibious aircraft, a fuselage, landing gear comprising a wheel supporting structure, an unsprung pivotal connection between said structure and the fuselage, a first wheel rotatable on an axis fixed in said structure, a second wheel rotatable on an axis vertically displaceable with respect to said structure and located closer to said pivotal connection than the axis of said first wheel, an engine in the fuselage, a steering control member in the fuselage, means for transmitting power from said engine to the wheel on said fixed axis including a member rotatable on the axis of said pivotal connection, and means for transmitting steering movement from said control member to the wheel on said displaceable axis including a link displaceable substantially along a line perpendicular to the axis of said pivotal connection.

8. In a vehicle, a body portion, supporting means therefor including a rotatable wheel and supporting structure therefor, the combination of an unsprung pivotal connection between said structure and the body portion, a steering control member in the body portion, a first linkage connected to said member a second linkage connected to the wheel to effect steering by alteration of the plane of rotation of the wheel, and a longitudinally displaceable link normally disposed substantially in a plane extending radially out from the axis of said unsprung pivotal connection, one end of said link being pivotally attached to said first linkage adjacent said pivotal connection, and the other end of said link being pivotally attached to said second linkage at a point relatively remote from said pivotal connection.

9. In a vehicle, a body portion, a supporting structure therefor, a wheel rotatable on an axis displaceable relative to said structure, an unsprung pivotal connection between said structure and the body portion, a steering control member in the body portion, a member rockable by said control member upon a pivot integral with said body portion and carrying a connecting element moved by such rocking approximately along a line perpendicular to the axis of said pivotal connection, a steering member rockable in a plane fixed relative to said structure to displace said wheel for effecting steering and carrying a connecting element moved by such rocking approximately along a line substantially coinciding with the aforesaid line, and a link connecting said two connecting elements.

10. The invention set forth in claim 8 in which said wheel axis is displaceable relative to said supporting structure said link is attached to said second linkage at a point which remains a fixed distance from the axis of said wheel.

11. In an amphibious vehicle, the combination of a float for supporting said vehicle upon a body of water, means for supporting said vehicle for movement along a solid surface comprising a recess in said float and a wheel partly enclosed in said recess, and propelling means including an engine having a driving connection with said wheel; watertight walls defining said recess and enclosing said wheel through angles substantially in excess of ninety (90°) degrees each way from a line extending vertically upward through the wheel center and converging downwardly toward the vertical line through the wheel center, said walls defining a smooth, curved, fluid stream passage between said wheel and said walls; and fins on said wheel adapted to pick up and propel, through said fluid stream passage, water from a body of water supporting said float.

12. The invention set forth in claim 11 in combination with a road tread on said wheel; said fins being in the form of transverse projections blending, peripherally of said wheel, into said tread and presenting a relatively smooth rolling face for engaging a solid surface.

13. In an amphibious vehicle, a body portion, steering control means in said body portion, an engine in said body portion, supporting means comprising two floats, an unsprung pivotal connection between each of said floats and said body portion, spring means restraining pivotal movement of each of said floats with respect to said body portion, a plurality of inverted wells in each float, each well being open at its base and extending upwardly into said float, one well in each float containing a wheel rotatable on an axis fixed relative to said float and having power drive connection with said engine, and one well in each float containing a wheel rotatable on an axis vertically displaceable relative to said float and having steering control connection to said steering control means.

14. In an amphibious vehicle, a body portion, supporting means comprising two floats, an unsprung pivotal connection between each of said floats and said body portion permitting independent pivotal displacement of each of said floats relative to said body portion, spring means restraining pivotal movement of each of said floats relative to said body portion, a first wheel in conjunction with each float rotatable on an axis fixed relative to said float at a position displaced longitudinally of the vehicle from the unsprung pivotal connection to said float, and a second wheel in conjunction with each float rotatable on an axis vertically sprung relative to said float at a position displaced longitudinally of the vehicle from the unsprung pivotal connection to said float in a direction opposite to the displacement of the axis of said first wheel.

HAROLD T. AVERY.

REFERENCES CITED

The following references are of record in the file of this patent:

UNITED STATES PATENTS

| Number | Name | Date |
|---|---|---|
| 1,408,899 | Marple | Mar. 7, 1922 |
| Re. 21,120 | De Seversky | June 20, 1939 |
| 2,135,073 | Gerhardt | Nov. 1, 1938 |
| 1,780,298 | Icre | Nov. 4, 1930 |
| 1,331,221 | Swanson | Feb. 17, 1920 |
| 1,879,700 | Mantor | Sept. 27, 1932 |
| 1,405,407 | Gill | Feb. 7, 1922 |
| 2,279,074 | Stearman | Apr. 7, 1942 |
| 2,023,312 | De Seversky | Dec. 3, 1935 |
| 1,930,922 | Burnelli | Oct. 17, 1933 |
| 1,214,536 | Gallaudet | Feb. 6, 1917 |
| 2,223,855 | Powell | Dec. 3, 1940 |
| 1,110,156 | Stewart | Sept. 8, 1914 |
| 1,710,869 | Farrell | Aug. 30, 1929 |

FOREIGN PATENTS

| Number | Country | Date |
|---|---|---|
| 228,245 | Great Britain | Jan. 29, 1925 |
| 463,502 | France | Feb. 25, 1914 |
| 143,591 | Great Britain | May 28, 1920 |
| 797,803 | France | Feb. 24, 1936 |
| 302,640 | Germany | Dec. 20, 1917 |